(12) United States Patent
Martin

(10) Patent No.: US 7,484,687 B2
(45) Date of Patent: Feb. 3, 2009

(54) PROPULSION DEVICE

(75) Inventor: Glenn Neil Martin, Christchurch (NZ)

(73) Assignee: Martin Aircraft Company Limited (NZ)

( * ) Notice: Subject to any disclaimer, the term of this patent is extended or adjusted under 35 U.S.C. 154(b) by 25 days.

(21) Appl. No.: 11/259,814

(22) Filed: Oct. 26, 2005

(65) Prior Publication Data

US 2006/0196991 A1    Sep. 7, 2006

(30) Foreign Application Priority Data

Mar. 4, 2005    (NZ) ...................... 538630

(51) Int. Cl.
*B64C 29/00* (2006.01)
*B64C 29/02* (2006.01)

(52) U.S. Cl. ..................................... 244/4 A

(58) Field of Classification Search ................ 244/4 A, 244/2, 903, 23 A, 23 R
See application file for complete search history.

(56) References Cited

U.S. PATENT DOCUMENTS

| | | | |
|---|---|---|---|
| 2,417,896 A | | 3/1947 | Zimmerman |
| 2,461,347 A | * | 2/1949 | Pentecost ..................... 244/4 A |
| 2,955,780 A | * | 10/1960 | Hulbert ..................... 244/23 R |
| 3,023,980 A | | 3/1962 | Martin et al. |
| 3,063,655 A | * | 11/1962 | Skavinsky ................ 244/23 R |
| 3,149,799 A | | 9/1964 | Hulbert |
| 3,173,629 A | * | 3/1965 | Uhor ........................... 244/46 |
| 3,184,183 A | * | 5/1965 | Plasecki ................... 244/23 R |
| 3,265,329 A | * | 8/1966 | Postelson ....................... 244/2 |
| 3,474,987 A | | 10/1969 | Meditz |
| 3,494,575 A | * | 2/1970 | Budworth ...................... 244/2 |
| 3,556,438 A | | 1/1971 | Meditz |
| 4,272,041 A | * | 6/1981 | Mabuchi et al. .......... 244/17.21 |
| 4,379,532 A | * | 4/1983 | Dmitrowsky ................ 244/4 A |
| 5,505,407 A | * | 4/1996 | chiappetta ....................... 244/2 |
| 5,779,188 A | | 7/1998 | Frick |
| 6,293,492 B1 | * | 9/2001 | Yanagisawa .............. 244/17.25 |
| 6,353,789 B1 | * | 3/2002 | Hanson ....................... 701/100 |
| 6,464,166 B1 | * | 10/2002 | Yoeli .......................... 244/12.1 |

(Continued)

FOREIGN PATENT DOCUMENTS

DE    2021043    11/1971

(Continued)

OTHER PUBLICATIONS

"H-21 Shawnee" Pike, John, Aug. 15, 2004, GlobalSecurity.org http://web.archive.org/web/20040815133402/http://www.globalsecurity.org/military/systems/aircraft/h-21.htm.*

(Continued)

*Primary Examiner*—Michael R Mansen
*Assistant Examiner*—Joseph W Sanderson
(74) *Attorney, Agent, or Firm*—Christie, Parker & Hale, LLP

(57) ABSTRACT

A personal flight device which consists of a housing securable to a pilot, at least one pair of fans, and at least one engine mounted on the housing for driving the fans; one fan of the pair is mounted to one side of the housing and the other fan of the pair is mounted to the other side of the housing; in use, both fans rotate in the same direction for producing thrust.

29 Claims, 8 Drawing Sheets

U.S. PATENT DOCUMENTS

| | | | | |
|---|---|---|---|---|
| 6,488,232 | B2 | 12/2002 | Moshier | |
| 6,708,920 | B2* | 3/2004 | Fukuyama | 244/12.4 |
| 6,817,570 | B2* | 11/2004 | Yoeli | 244/12.1 |
| 6,824,095 | B2* | 11/2004 | Mao | 244/12.5 |
| 6,848,649 | B2* | 2/2005 | Churchman | 244/12.6 |
| 6,854,686 | B2* | 2/2005 | Perlo et al. | 244/7 B |
| 7,188,803 | B2* | 3/2007 | Ishiba | 244/23 R |
| 2002/0104921 | A1* | 8/2002 | Louvel | 244/12.1 |
| 2002/0113165 | A1 | 8/2002 | Moshier | |
| 2005/0178879 | A1* | 8/2005 | Mao | 244/7 B |

FOREIGN PATENT DOCUMENTS

| | | |
|---|---|---|
| DE | 2552888 | 6/1977 |
| DE | 4302791 | 8/1994 |
| FR | 2667568 | 4/1992 |
| RU | 2 135 393 | 8/1999 |
| RU | 2135393 C | 8/1999 |
| WO | WO 00/35751 A | 6/2000 |

OTHER PUBLICATIONS

"Fonderie Miniature 1/48 Piasecki H-21" von Aken, Scott, Aug. 4, 2004, Modelingmadness.com http://web.archive.org/web/20040804093536/http://www.modelingmadness.com/scotts/korean/fmh21preview.htm.*

"Shawnees Over South Vietnam 1962" US Army, 1962, available at Wikipedia.org http://upload.wikimedia.org/wikipedia/en/0/03/Shawnees_over_south_vietnam_1962.gif.*

"CH-47 Chinook" Wikipedia, edited Oct. 13, 2004 http://en.wikipedia.org/w/index.php?title=CH-47_Chinook&oldid=7080365.*

USS Enterprise NCC-1701-D captain's chair, "Star Trek: The Next Generation" Creator Gene Roddenberry, aired 1987-1994, Paramount Television Image available at Star Trek Wiki, http://memory-alpha.org/en/wiki/Image:Enterprisedcommandchair.jpg.*

PCT International Search Report dated Apr. 11, 2006 for PCT Application PCT/NZ2006/000029.

* cited by examiner ved by rocket fuel which is intrinsically dangerous.
PROPULSION DEVICE

CROSS-REFERENCE TO RELATED APPLICATION

This application is based upon and claims priority on New Zealand Patent Application No. 538630, filed on Mar. 4, 2005.

FIELD OF THE INVENTION

The present invention relates to a vertical take-off and landing personal flight device, i.e. a device which can be secured to the pilot rather like a jet belt, and which gives the pilot controllable powered flight.

BACKGROUND OF THE INVENTION

Personal flight devices were developed in the 1960s and 1970s, but were essentially rocket based devices (jet belts) which gave extremely short flight times (typically about 26 seconds) and were difficult to control. Further, these devices were fuelled by rocket fuel which is intrinsically dangerous.

In a related type of device fuel is fed to a catalyst bed to produce hot gas which is distributed between two spaced counter-rotating turbines to generate vertical thrust from the turbine exhausts. The device is steered by shrouds or deflector rings pivoted to the base of each turbine.

More recently, a number of personal flight devices have been proposed which use ducted fans as their means of propulsion: —for example a device which includes a pair of ducted fans and which is steered by tilting the ducted fans relative to the pilot.

A broadly similar type of design has been proposed, using shrouded propellers rather than ducted fans.

As the terms are used in this specification, the distinction between a 'shrouded propeller' and a 'ducted fan' essentially is that a ducted fan comprises one or more rotating aerofoils or fans (single or multi-bladed) mounted completely within a duct; the duct increases the overall efficiency of the fan. A shrouded propeller comprises a rotating aerofoil or propeller which is surrounded by a shroud, the only function of the shroud being to protect the propeller—the shroud does not appreciably affect the efficiency of the propeller.

A further proposal describes a device which includes a pair of ducted fans. In this device, the fans are rigidly secured to the supporting harness, and steering is achieved by control flaps mounted adjacent to the outlet of each fan. However, in this design the two fans are contra-rotating and thus have to be driven via a gearbox using a relatively complex rigid transmission system; this adds considerable weight to the device.

Other prior art proposals have been for single shrouded propellers or ducted fans. Single propeller/fan devices have the drawback that the propeller/fan has to be extremely large to provide adequate lift, and to balance the devices the pilot generally has the propeller/fan above or below him, which is far from ideal from a safety point of view. A further drawback is that the thrust from a single propeller/fan has to be split in some way to give steering and this tends to result in high frictional losses in the steering tubes or ducts.

SUMMARY OF THE INVENTION

An object of the present invention is a personal flight device which overcomes the disadvantages of the prior art devices described above, and which provides a lightweight yet powerful personal flight device which is comparatively safe to use.

The present invention provides a personal flight device which includes:
- a housing which is securable to a pilot;
- at least one pair of fans, one fan of the pair mounted to one side of the housing, and the other fan of the pair mounted to the other side of the housing; and
- at least one engine mounted on the housing for driving the fans, wherein both fans rotate in the same direction for producing thrust.

It is envisaged that the device probably would use only a single engine and a single pair of fans, since it is important for most applications to keep the overall weight of the device as low as possible. However, it would be possible to use more than one pair of fans, each pair driven by its own engine or both/all pairs driven by a single engine. Preferably, each fan would be a ducted fan, but it would be possible to use a non-ducted fan.

Preferably, the housing is securable to a pilot by means of a harness, and includes protective shielding between the pilot and the engine and fans.

The engine may be any suitable reliable, robust, lightweight engine e.g. a two-stroke or a four-stroke internal combustion engine, rotary engine, or a gas turbine.

The drive means may be any reliable lightweight drive means e.g. a chain drive, a fluid drive or a belt drive. Preferably, the drive means is a flexible belt drive, most preferably a toothed belt drive or a micro-V belt drive. A belt drive is preferred because a belt drive may easily be inspected by a pilot to check for wear or damage, and modern belt drives give a low-weight high-efficiency drive. For additional security, two or more drive means may be used in parallel.

Preferably, the device also includes steering means, which may be any suitable means, e.g. a steering vane on one or more fans; a moveable steering shroud around the lower end of one or more fans; or steering jets. Preferably, the steering means comprises a steering vane on each fan, arranged to direct the airflow leaving the fan in use, and controllable by the pilot.

In an exemplary embodiment, a personal flight device is provided having a housing which is securable to a pilot. The exemplary device also includes at least one pair of fans, one fan of the pair mounted to one side of the housing, and the other fan of the pair mounted to the other side of the housing, and at least one engine mounted on the housing for driving the fans, where both fans rotate in the same direction for producing thrust. In another exemplary embodiment, each fan rotates about an axis of rotation, and the axis of rotation of each fan is fixed relative to the housing. In a further exemplary embodiment, each fan is secured to the housing such that the axis of rotation of each fan is substantially vertical when the device is secured to a pilot standing upright. In another exemplary embodiment, the device further includes a steering vane coupled to at least one fan. With this exemplary embodiment, the vane is controllable for directing the airflow leaving the at least one fan. In another exemplary embodiment, a steering vane is coupled to each of fans for directing airflow leaving each fan. In yet a further exemplary embodiment, the device includes a mounting for a throttle control and a control for the steering vane. In another exemplary embodiment, each fan is a ducted fan including a duct surrounding the fan and defining an intake. In yet a further exemplary embodiment, the device includes a drive means driven by the at least one engine and driving the at least one pair of fans. The drive means may, in an exemplary embodiment, be a single drive, a double drive, a toothed belt drive, a micro-V belt drive, or a drive selected from the group consisting of chain drives, fluid drives, and belt drives. In another exemplary embodiment a parachute is coupled to the housing. In yet another exemplary embodiment, each fan is mounted within a duct, and the device further includes a set of stators arranged in each fan duct to straighten the airflow leaving that fan.

In another exemplary embodiment, a personal flight device is provided having a housing, a pair of fans mounted on the housing, each fan rotating about an axis of rotation where the axis of rotation of each fan is fixed relative to the housing. The exemplary embodiment device also includes an engine mounted in the housing driving the pair of fans. In a further exemplary embodiment, the device includes a duct surrounding each fan. The duct in another exemplary embodiment is fixed relative to the housing. The device in a further exemplary embodiment includes a set of stators associated with each fan and arranged to straighten the airflow leaving each fan. In yet another exemplary embodiment, the device includes a control vane for steering an airflow generated by one of the fans for steering the device. In a further exemplary embodiment, the device includes a second control vane for steering an airflow generated by the other of the fans for steering the device. In yet a further exemplary embodiment, each fan is ducted and each control vane is mounted on the duct of the fan whose airflow the vane steers. In another exemplary embodiment both fans rotate in the same direction.

BRIEF DESCRIPTION OF THE DRAWINGS

By way of example only, a preferred embodiment of the present invention is described in detail with reference to the accompanying drawings in which.

DETAILED DESCRIPTION OF THE INVENTION

Figure 1:
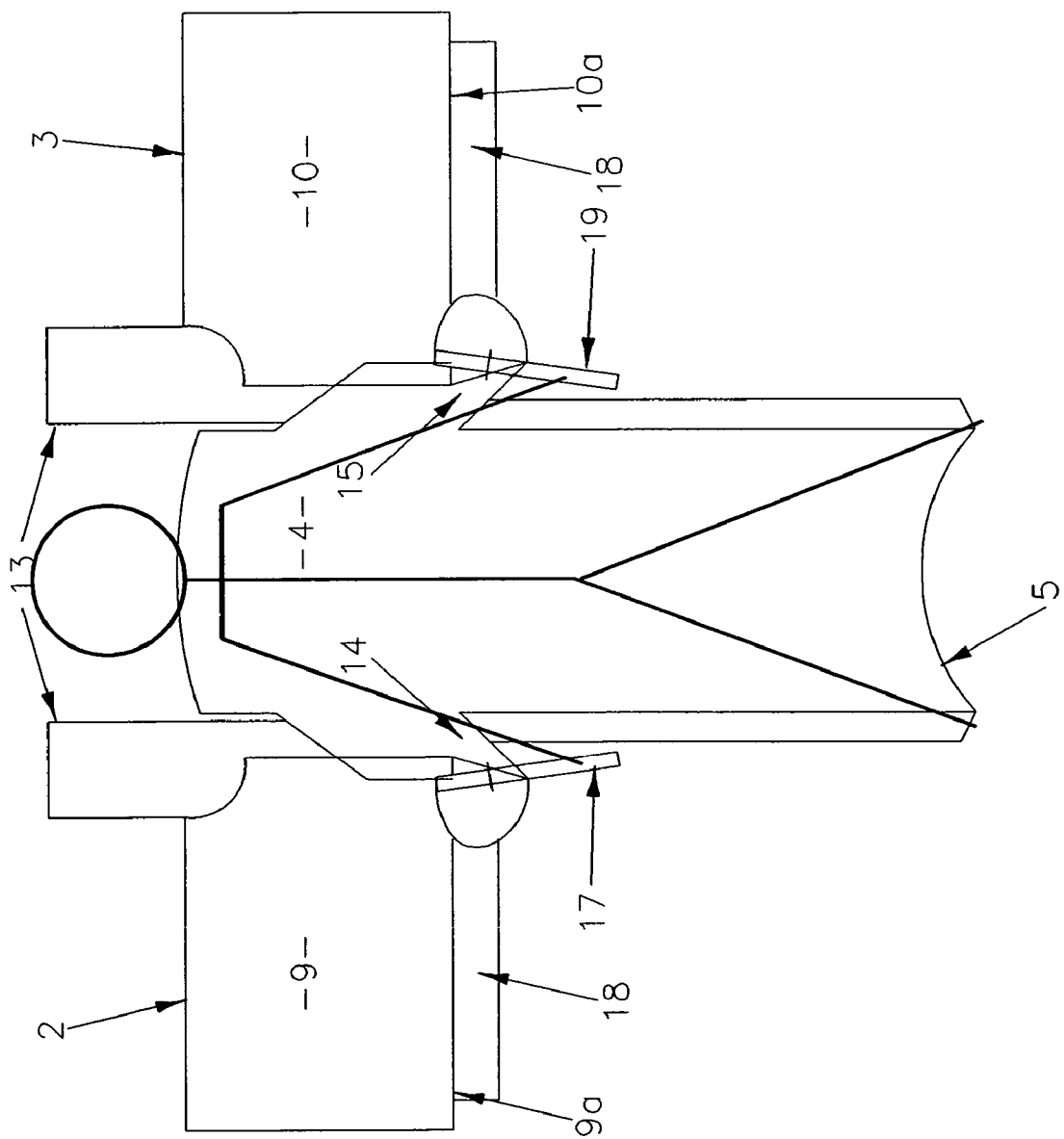
FIG. 1 is a diagrammatic front view of a device in accordance with the present invention.

Referring to the drawings, a personal flight device 1 includes a pair of ducted fans 2,3 which are supported and spaced apart by a central housing 4, which also supports an engine 6 and a fuel tank (not visible).

The ducted fans 2,3 are of known design and consist of a central multi-blade fan 7,8 mounted on, and rotatable with, a hub 7a,8a, inside a concentric cylindrical duct 9, 10. The ducts 9,10 are rigidly mounted on the housing 4 by mounting brackets 4a (visible in FIG. 2 only) and are oriented such that in the "at rest" position shown in FIGS. 1 and 3, (i.e. when the device is resting on the ground) the axis of rotation of each fan is substantially vertical. The ends of the ducts 9,10 are depicted as open, but may in fact be covered by a protective grill or mesh.

Figure 4:
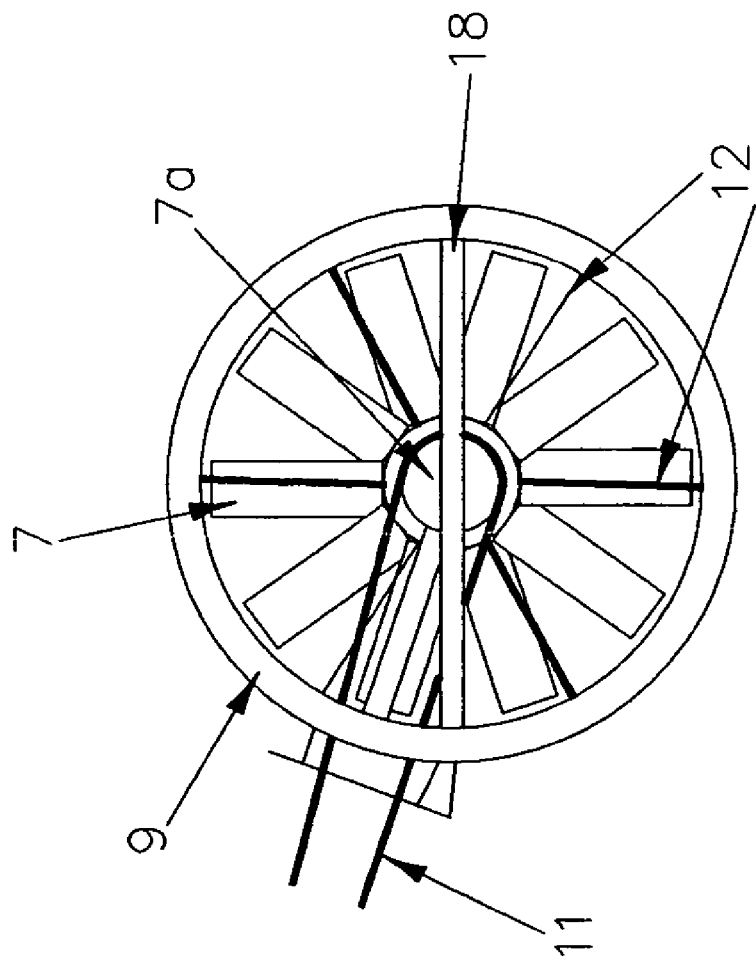
FIG. 4 is a view of one ducted fan from below.
Figure 6:
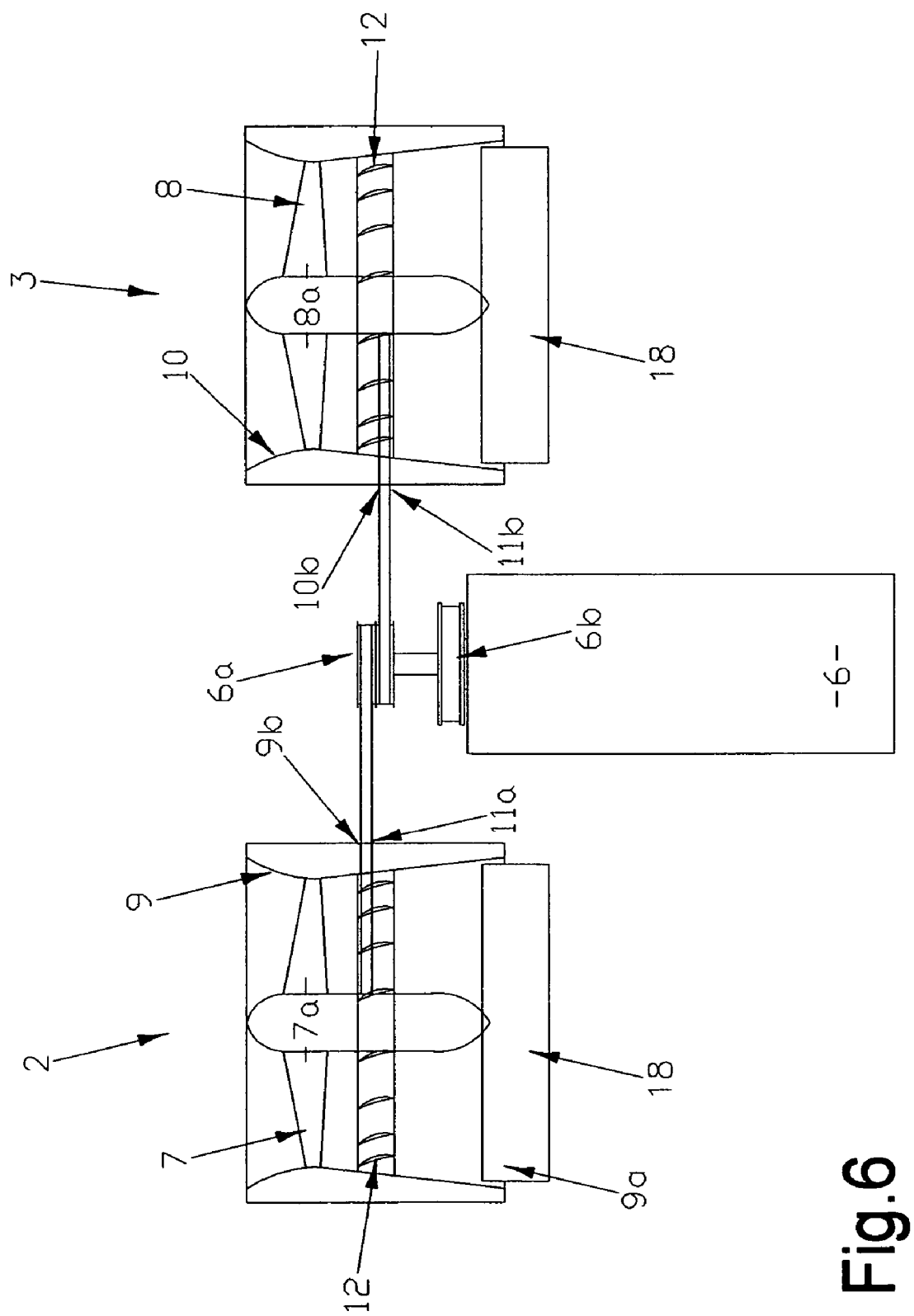
FIG. 6 is a diagram of the drive arrangement.
Figure 7:
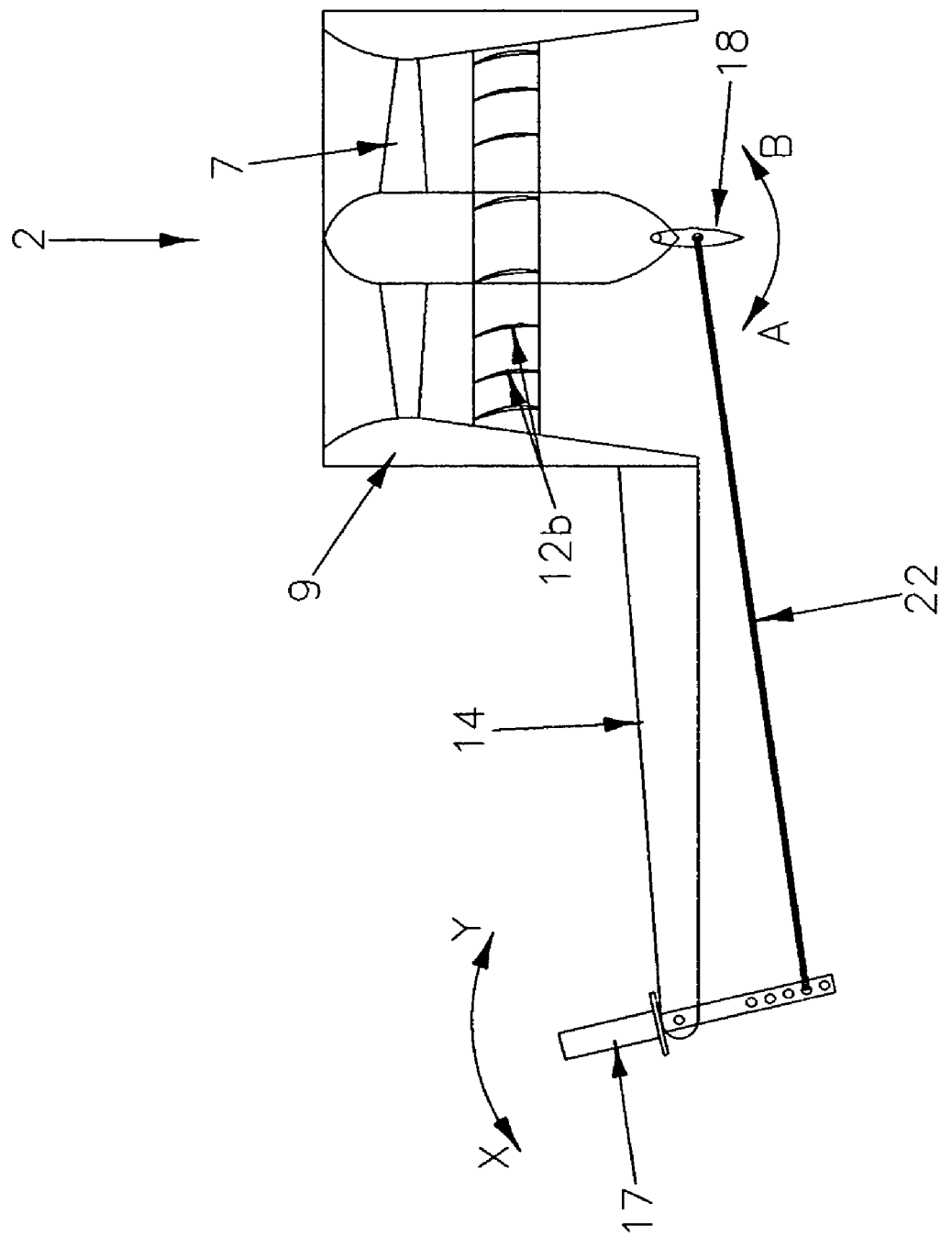
FIG. 7 is a diagram of part of the control system.

The fans 7,8 are driven from the engine 6 by a drive means in the form of a pair of toothed drive belts 11a,11b to the corresponding hub 7a,8a. The toothed belt drive is shown (diagrammatically) in FIGS. 4 and 6. As shown in FIG. 6, the engine 6 drives a drive pulley 6a through a flexible coupling 6b, to dampen torsional vibration from the engine 6. Two drive belts 11a, 11b are engaged with the drive pulley 6a, one belt alongside the other.

The first drive belt 11a passes around the pulley 6a, through an aperture 9b in the duct 9 and around the hub 7a to drive the fan 7. The second drive belt 11b passes around the pulley 6a, through an aperture 10b in the duct 10, and around the hub 8a to drive the fan 8. In use, both fans 7,8 are rotated in the same direction, but the airflow from the bottom 9a, 10a, of each duct 9,10 is made linear (i.e. substantially parallel to the longitudinal axis of the corresponding fan) by the use of a row of stators 12. The stators 12 are spaced, and extend radially around the inner circumference of each duct 9,10 below the corresponding fan 7,8. Each stator 12 is a 'spoke' which extends radially from the inner wall of the duct towards the hub.

Figure 8A:
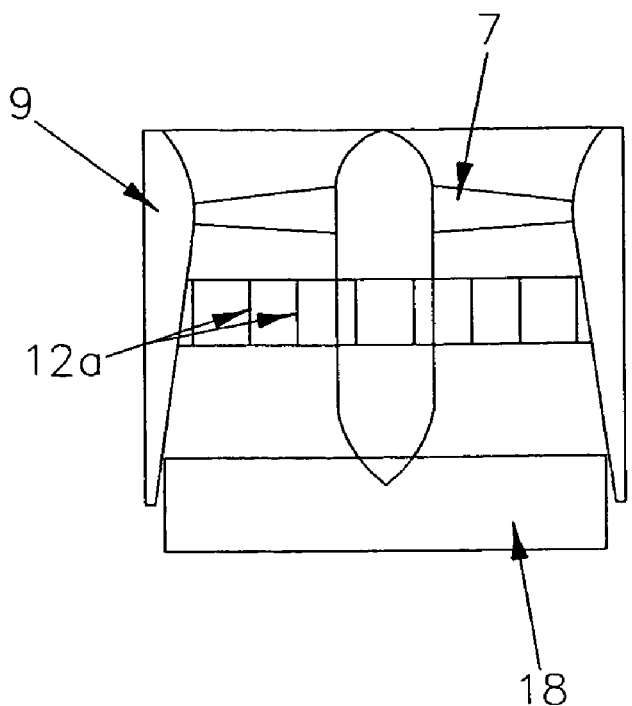
FIGS. 8a and 8b are diagrams of two different versions of stators.

FIG. 8a shows the simplest arrangement of stators, in which each stator is a flat parallel-sided plate, with the length of each plate extending radially from the inner wall of the duct towards the hub.

Figure 8B:
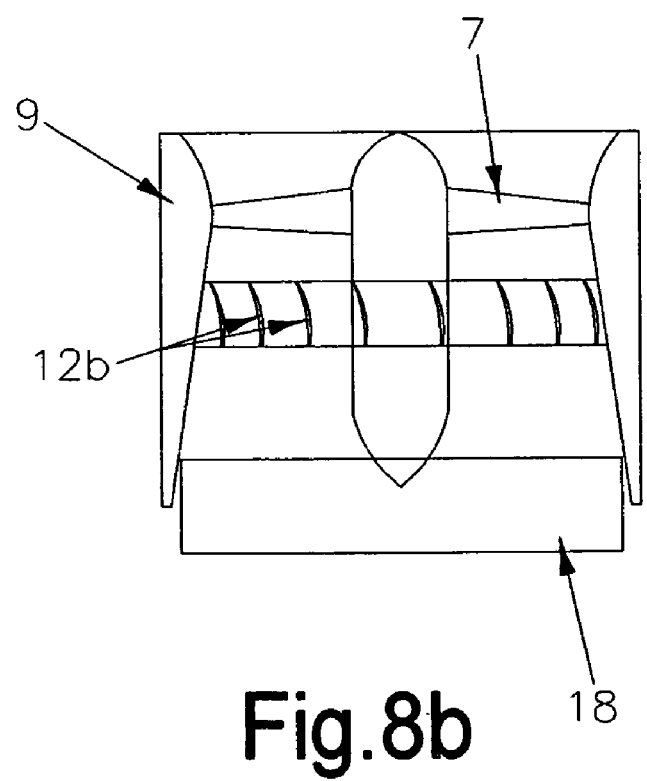
Figure 9:
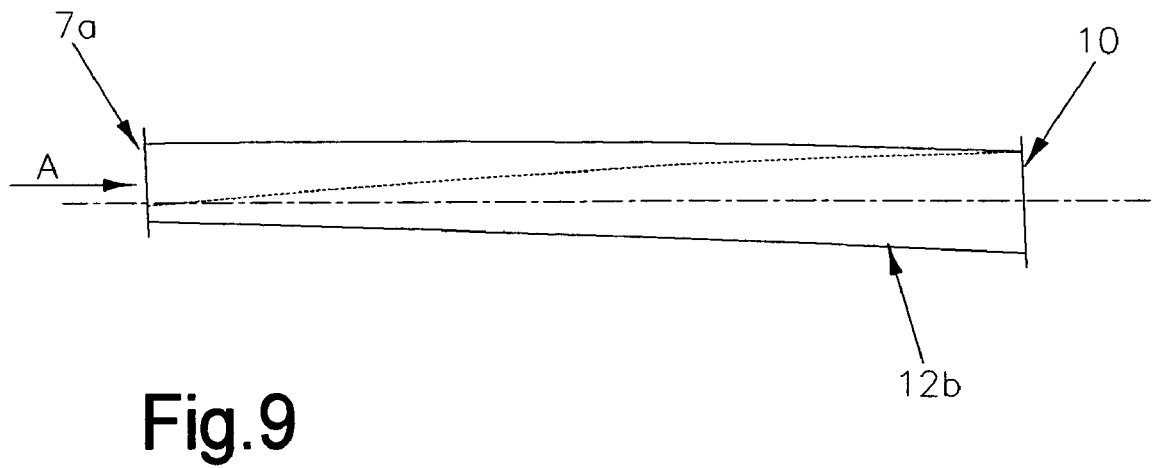
FIG. 9 is a plan view of a stator of FIG. 8b on a larger scale.
Figure 10:
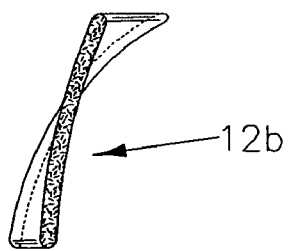
FIG. 10 is a view in the direction of Arrow A of FIG. 9.

FIGS. 8b,9 and 10 illustrate a more aerodynamically efficient design of stator 12b, in which each stator 12b is a curved aerofoil cross-section plate, one end of which is secured to the inner wall of the duct and the other end of which is secured to the hub. As shown in FIGS. 9 and 10, each stator 12b twists along its longitudinal axis from the hub to the duct. Stators of this design have a higher efficiency than the simple flat stators 12a, but are more expensive to produce and to fit.

Figure 3:
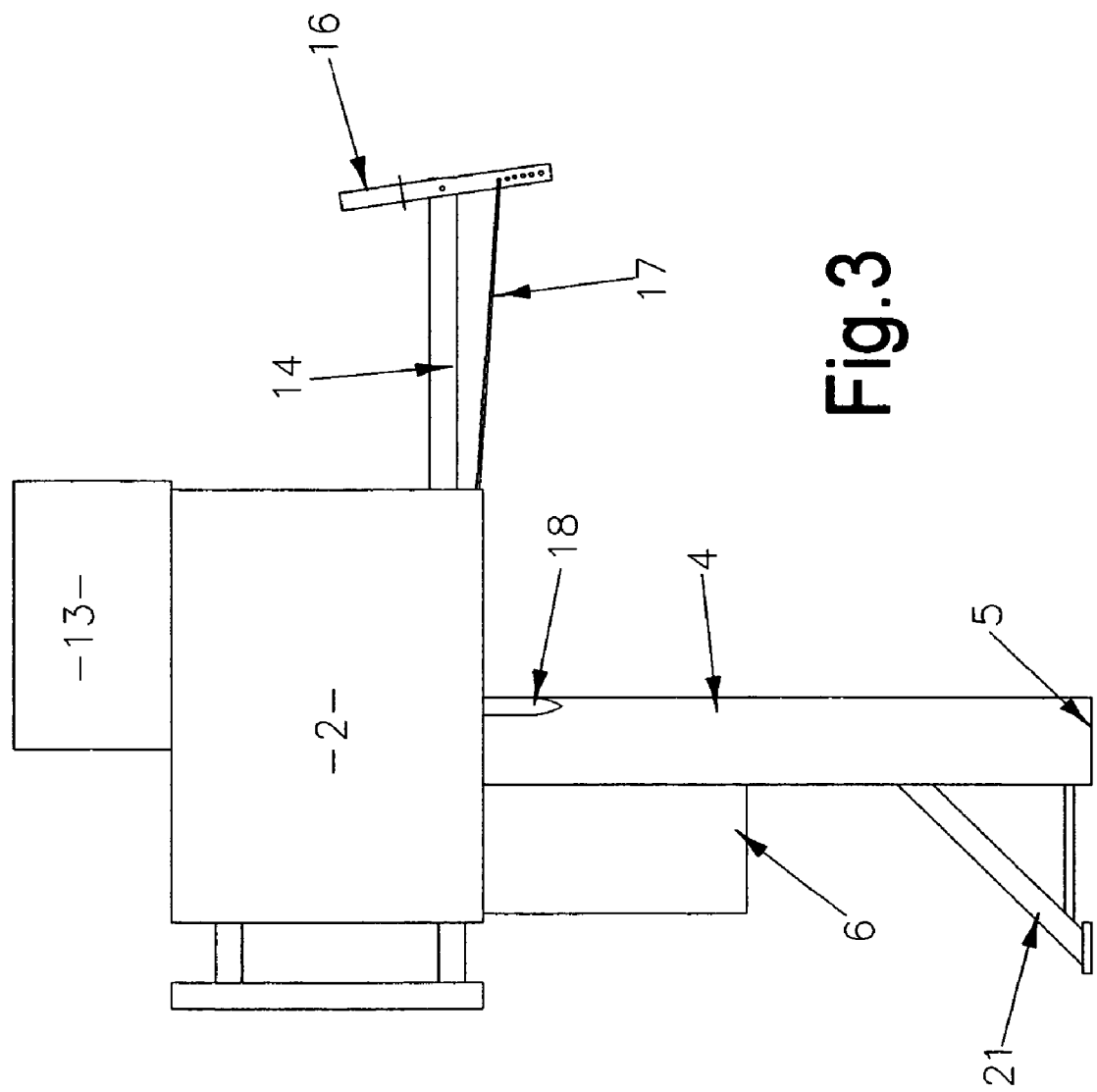
FIG. 3 is a side view of the device of FIG. 1.

The housing 4 is slightly wider than the shoulder width of the pilot, and approximately the same height as the pilot. In the "at rest" position shown in FIGS. 1 and 3 of the drawings, the lower edge 5 of the housing 4 rests on the ground and is stabilised by a pair of angled rear supports 21 (FIG. 3 only).

Figure 2:
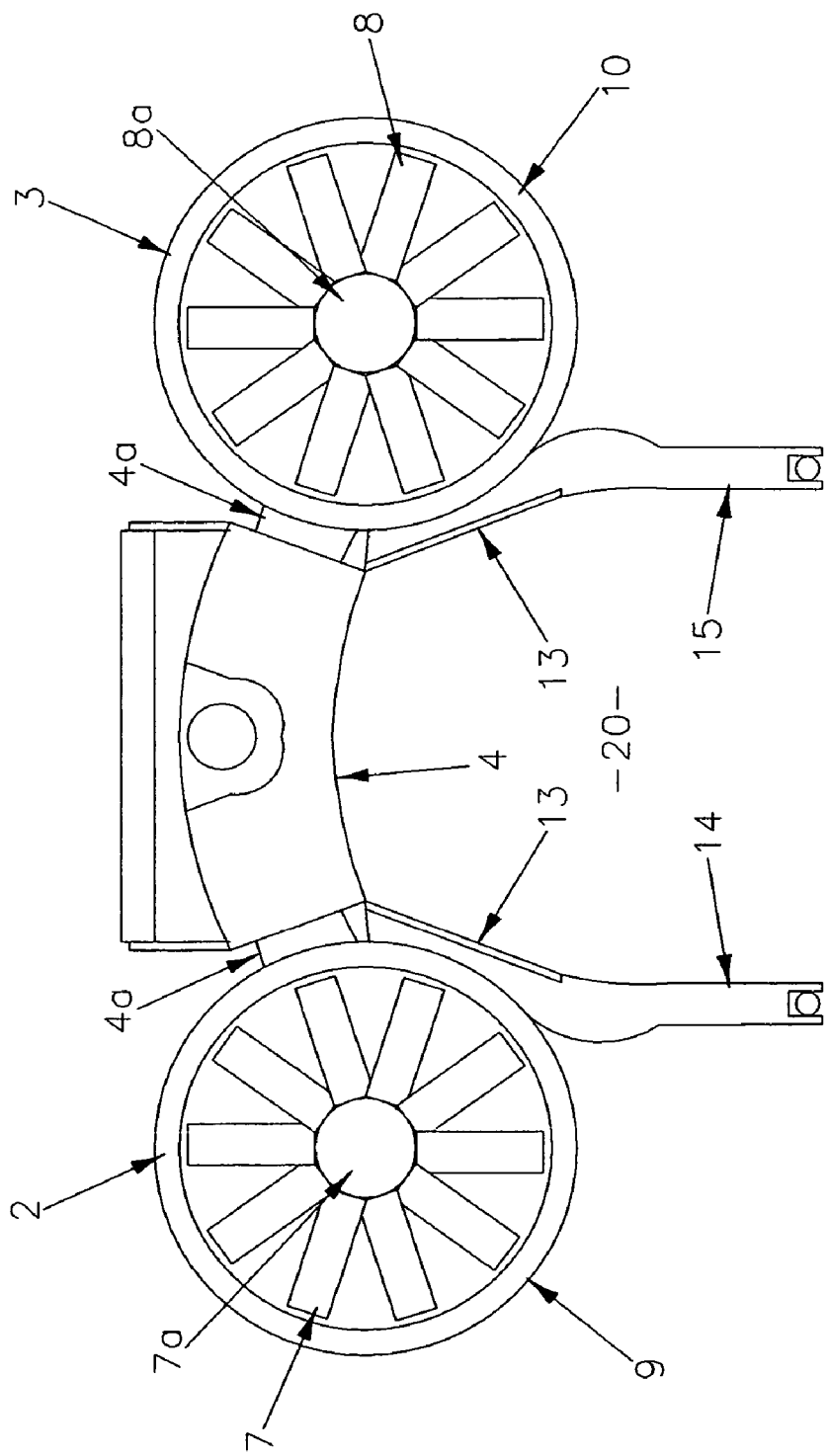
FIG. 2 is a plan view from above of the device of FIG. 1.

The housing 4 provides head shields 13 and armrests 14,15 (FIGS. 1 and 2). The armrest 14 incorporates a twist grip throttle 16 and a control lever 17. The twist grip throttle 16 is connected to the engine 6 and is used to control the acceleration of the engine in known manner. The control lever 17 is connected to the control vane 18 for the fan 2 by a rod 22. As shown in greater detail in FIG. 8, the lever 17 is pivoted to the outer end of the arm rest 14, and the end of the lever 17 below the arm rest 14 is connected to one end of the rod 22, the other end of which is connected adjacent the lower end of the control vane 18. The control lever 19 is connected to the arm rest 15 and the control vane for the fan 3 in the same manner.

The control arrangement for the control vanes is a simple lever control. In the case of fan 2, movement of the control lever 17 in the direction of arrow X moves the control vane in the direction of arrow B, and movement of the lever 17 in the direction of arrow Y moves the control vane in the direction of arrow A. Alternatively, a cable could be used in place of each rod. Another possibility is to use a non-mechanical control system, by substituting an electric actuator for controlling each control vane.

Figure 5:
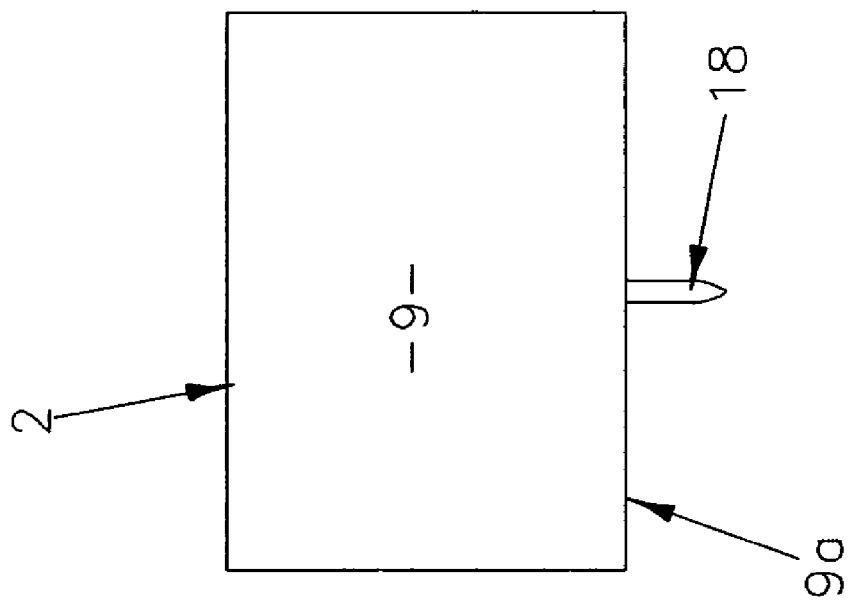
FIG. 5 is a side view of the fan of FIG. 4.

Each control vane is mounted diametrically across the lower edge 9a,10a, of the corresponding duct 9,10 and is arranged to pivot about an axis substantially perpendicular to the axis of rotation of the corresponding fan and hub. Each vane has an aerofoil cross section. Each vane projects partly below the lower edge of the corresponding duct, as shown in FIG. 5.

In use, the pilot stands in the space 20 (FIG. 2) and is strapped to the device by means of a parachute type a harness (not shown) which is mounted on the housing 4. Once strapped in, the pilot starts the engine 6 to rotate the fans 7,8 within the ducts 9,10 to give vertical lift to the device. The amount of lift is governed by the acceleration of the engine 6, which is controlled by the throttle 16. Forward movement is given by angling the control vanes of the fans 2,3 using the control levers 17,19. The control vanes also are used to turn the device left or right.

Rotating both fans 7,8 in the same direction means that the fans can be driven directly from the engine and there is no need for a gearbox to alter the direction of drive. This saves a great deal of additional weight, and also eliminates a component which would need maintenance and be a possible source of failure. Rotating both fans in the same direction would impart torque to the device were it not for the stators which render the airflow leaving the fans 2,3 substantially linear.

The device in an exemplary embodiment is fitted with a parachute (not shown) which in emergencies can be opened by the pilot to bring the device and the pilot together safely to the ground.

It is envisaged that the primary use of the above-described device would be a one-person transport. However, it would be possible to substitute any of a range of remote-control devices for the pilot, which would allow the pilot to operate the device remotely.

The invention claimed is:

1. A personal flight device comprising:
    a housing which is physically securable to a pilot, said pilot standing during use;
    at least one pair of fans, one fan of the pair mounted to the housing so as to be adjacent to one side of the pilot, and the other fan of the pair mounted to the housing so as to be adjacent to another side of the pilot, wherein each fan rotates about an axis of rotation, wherein the axis of rotation of each fan of said pair of fans is fixed relative to the housing; and
    at least one engine mounted on the housing for driving the fans, wherein both fans rotate in the same direction for producing thrust, said at least one engine being mechanically coupled to said fans for mechanically driving said fans.

2. The personal flight device as claimed in claim 1, wherein each fan is secured to the housing such that the axis of rotation of each fan is substantially vertical when the device is secured to a pilot standing upright.

3. The personal flight device as claimed in claim 1, further comprising a steering vane coupled to at least one fan, said vane being controllable for directing the airflow leaving the at least one fan.

4. The personal flight device as claimed in claim 3, wherein the steering vane comprises a plate having an aerofoil cross-section and mounted diametrically across a lower edge of a duct surrounding said at least one fan.

5. The personal flight device as claimed in claim 3, wherein the housing incorporates:
    a mounting for a throttle control; and
    a control for the steering vane.

6. The personal flight device as claimed in claim 5, wherein the throttle control mounting and the control for the steering vane are mounted on armrests extending from the housing.

7. The personal flight device as claimed in claim 1, wherein the housing comprises a protective shielding for shielding the pilot from the engine and fans.

8. The personal flight device as claimed in claim 1, wherein the housing comprises a harness for securing the device to the pilot.

9. The personal flight device as claimed in claim 1, wherein each fan is a ducted fan comprising a duct surrounding the fan and defining an intake.

10. The personal flight device as claimed in claim 9, wherein said intake is covered with a mesh.

11. The personal flight device as claimed in claim 1, wherein the at least one engine is selected from the group consisting of two-stroke internal combustion engines, four-stroke internal combustion engines, rotary engines, and gas turbine engines.

12. The personal flight device as claimed in claim 1, further comprising a drive means driven by the at least one engine, said driven drive means connecting said at least one engine to said at least one pair of fans for driving the at least one pair of fans.

13. The personal flight device as claimed in claim 12, wherein the drive means comprises a single drive.

14. The personal flight device as claimed in claim 12, wherein the drive means comprises a double drive.

15. The personal flight device as claimed in claim 12, wherein the drive means comprises a drive selected from the group consisting of chain drives, fluid drives, and belt drives.

16. The personal flight device as claimed in claim 12, wherein the drive means is a toothed belt drive.

17. The personal flight device as claimed in claim 12, wherein the drive means is a micro-V belt drive.

18. The personal flight device as claimed in claim 1, wherein the device comprises only a single pair of ducted fans and a single engine.

19. The personal flight device as claimed in claim 1, further comprising a parachute coupled to the housing.

20. The personal flight device as claimed in claim 1, wherein each fan is mounted within a duct, wherein the device further comprises a set of stators arranged in each fan duct to straighten the airflow leaving that fan.

21. The personal flight device as claimed in claim 20, wherein the stators of each set have one end secured to an inner wall of the duct and another end secured to a hub of the fan within the duct.

22. The personal flight device as claimed in claim 20, wherein each stator is a flat parallel sided plate.

23. The personal flight device as claimed in claim 20, wherein each stator comprises a curved aerofoil cross-section.

24. The personal flight device as recited in claim 1, further comprising a duct for each fan, wherein each duct surrounds each fan.

25. The personal flight device as recited in claim 24 wherein each duct is fixed relative to the housing.

26. The personal flight device as recited in claim 24 further comprising a set of stators associated with each fan and arranged to straighten the airflow leaving that fan.

27. The personal flight device as recited in claim 24 further comprising a control vane for steering an airflow generated by one of the fans for steering the device.

28. The personal flight device as recited in claim 27 further comprising a second control vane for steering an airflow generated by the other of said fans for steering the device.

29. The personal flight device as recited in claim 28 wherein each control vane is mounted on the duct of the fan whose airflow said vane steers.

* * * * *